United States Patent
Vispute et al.

(10) Patent No.: US 11,522,458 B2
(45) Date of Patent: Dec. 6, 2022

(54) BOOTSTRAP VOLTAGE REFRESH FOR BUCK-BOOST CONVERTER

(71) Applicant: Cypress Semiconductor Corporation, San Jose, CA (US)

(72) Inventors: Hemant Prakash Vispute, Bangalore (IN); Partha Mondal, Paschim Medinipur (IN); Pulkit Shah, Bangalore (IN); Hariom Rai, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 43 days.

(21) Appl. No.: 17/320,011

(22) Filed: May 13, 2021

(65) Prior Publication Data

US 2022/0069710 A1    Mar. 3, 2022

Related U.S. Application Data

(60) Provisional application No. 63/073,566, filed on Sep. 2, 2020.

(51) Int. Cl.
| | |
|---|---|
| *H02M 3/158* | (2006.01) |
| *H02M 1/08* | (2006.01) |
| *H02M 3/157* | (2006.01) |
| *G06F 13/42* | (2006.01) |

(52) U.S. Cl.
CPC ........... *H02M 3/1582* (2013.01); *H02M 1/08* (2013.01); *H02M 3/157* (2013.01); *G06F 13/4282* (2013.01); *G06F 2213/0042* (2013.01)

(58) Field of Classification Search
CPC ...... H02M 3/1582; H02M 1/08; H02M 3/157; H02M 1/0006
See application file for complete search history.

(56) References Cited

U.S. PATENT DOCUMENTS

| | | | |
|---|---|---|---|
| 8,022,746 B1 * | 9/2011 | Signoretti | H03K 17/6871 327/423 |
| 2016/0365790 A1 * | 12/2016 | Ye | H02M 3/1582 |

* cited by examiner

*Primary Examiner* — Adolf D Berhane
*Assistant Examiner* — Afework S Demisse
(74) *Attorney, Agent, or Firm* — Lowenstein Sandler LLP (57) ABSTRACT

An apparatus includes a first high-side driver of a buck-boost converter, the first high-side driver powered between a first bootstrap voltage (VBST1) and a first output voltage of a first high-side switch driven by the first high-side driver. A second high-side driver is powered between a second bootstrap voltage (VBST2) and a second output voltage of a second high-side switch driven by the second high-side driver. A comparator is to detect VBST1 drop below a threshold value with respect to the first output voltage when the buck-boost converter is in boost mode. A leakage control circuit is to boost, using VBST2 as a voltage source, VBST1 each cycle of boost mode in which an output of the comparator is enabled.

20 Claims, 8 Drawing Sheets

BOOTSTRAP VOLTAGE REFRESH FOR BUCK-BOOST CONVERTER

RELATED APPLICATIONS

This application claims the benefit of U.S. Provisional Patent Application No. 63/073,566, filed on Sep. 2, 2020, the entire contents of which is incorporated herein by this reference.

TECHNICAL FIELD

This disclosure relates to integrated circuits (ICs) that control Universal Serial Bus (USB) power delivery to electronic devices.

BACKGROUND

Various electronic devices (e.g., such as smartphones, tablets, notebook computers, laptop computers, chargers, adapters, power banks, etc.) are configured to transfer power through USB connectors according to USB power delivery protocols defined in various versions and revisions of the USB Power Delivery (USB-PD) specification. For example, in some applications an electronic device may be configured as a power consumer to receive power through a USB connector (e.g., for battery charging), while in other applications an electronic device may be configured as a power provider to provide power to another device that is connected thereto through a USB connector. In various applications, electronic manufacturers may also use power converters (e.g., such as buck-boost converters) that need to meet various USB-PD specification requirements such as, for example, requirements for output voltage (Vout) monotonicity and stability.

DETAILED DESCRIPTION

The following description sets forth numerous specific details such as examples of specific systems, components, methods, and so forth, in order to provide a good understanding of various embodiments of bootstrap voltage refresh of buck-boost converters for USB Type-C controllers as described herein. It will be apparent to one skilled in the art, however, that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present embodiments.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Described herein are various embodiments of bootstrap voltage refresh of buck-boost converters for USB Type-C controllers that can be disposed to operate in various electronic devices. Examples of such electronic devices include, without limitation, personal computers (e.g., laptop computers, notebook computers, etc.), mobile computing devices (e.g., tablets, tablet computers, e-reader devices, etc.), mobile communication devices (e.g., smartphones, cell phones, personal digital assistants, messaging devices, pocket PCs, etc.), connectivity and charging devices (e.g., cables, hubs, docking stations, adapters, chargers, etc.), audio/video/data recording and/or playback devices (e.g., cameras, voice recorders, hand-held scanners, monitors, etc.), and other similar electronic devices that can use USB interfaces for communication, battery charging, and/or power delivery.

As used herein, "USB-enabled" device or system refers to a device or system that includes, is configured with, or is otherwise associated with a USB connector interface. A USB-enabled electronic device may comply with at least one release of a Universal Serial Bus (USB) specification. Examples of such USB specifications include, without limitation, the USB Specification Revision 2.0, the USB 3.0 Specification, the USB 3.1 Specification, the USB 3.2 Specification and/or various supplements, versions and errata thereof. The USB specifications generally define the characteristics (e.g., attributes, protocol definition, types of transactions, bus management, programming interfaces, etc.) of a differential serial bus that are required to design and build standard communication systems and peripherals.

For example, a USB-enabled peripheral device attaches to a USB-enabled host device through a USB port of the host device to form a USB-enabled system. A USB 2.0 port includes a power voltage line of 5V (denoted VBUS), a differential pair of data lines (denoted D+ or DP, and D− or DN), and a ground line for power return (denoted GND). A USB 3.0 port also provides the VBUS, D+, D−, and GND lines for backward compatibility with USB 2.0. In addition, to support a faster differential bus (the USB SuperSpeed bus), a USB 3.0 port also provides a differential pair of transmitter data lines (denoted SSTX+ and SSTX−), a differential pair of receiver data lines (denoted SSRX+ and SSRX−), a power line for power (denoted DPWR), and a ground line for power return (denoted DGND). A USB 3.1 port provides the same lines as a USB 3.0 port for backward compatibility with USB 2.0 and USB 3.0 communications, but extends the performance of the SuperSpeed bus by a collection of features referred to as Enhanced SuperSpeed.

A more recent technology for USB connectors, called USB Type-C (also referred to herein as "USB-C"), is defined in various releases and/or versions of the USB Type-C specification. The USB Type-C specification defines Type-C receptacle, Type-C plug, and Type-C cables that can support USB communications as well as power delivery over newer USB power delivery protocols defined in various revisions/versions of the USB-PD specification. Examples of USB Type-C functions and requirements may include, without limitation, data and other communications according to USB 2.0 and USB 3.0/3.1, electro-mechanical definitions and performance requirements for Type-C cables, electro-mechanical definitions and performance requirements for Type-C receptacles, electro-mechanical definitions and performance requirements for Type-C plugs, requirements for Type-C to legacy cable assemblies and adapters, requirements for Type-C-based device detection and interface configuration, requirements for optimized power delivery for Type-C connectors, etc. According to the USB Type-C specification(s), a Type-C port provides VBUS, D+, D−, GND, SSTX+, SSTX−, SSRX+, and SSRX− lines, among others. In addition, a Type-C port also provides a Sideband Use (denoted SBU) line for signaling of sideband functionality and a Configuration Channel (or communication channel, denoted CC) line for discovery, configuration, and management of connections across a Type-C cable. A Type-C port may be associated with a Type-C plug and/or a Type-C receptacle. For ease of use, the Type-C plug and the Type-C receptacle are designed as a reversible pair that operates regardless of the plug-to-receptacle orientation. Thus, a standard USB Type-C connector, disposed as a standard Type-C plug or receptacle, provides pins for four VBUS lines, four ground return (GND) lines, two D+ lines (DP1 and DP2), two D− lines (DN1 and DN2), two SSTX+ lines (SSTXP1 and SSTXP2), two SSTX− lines (SSTXN1 and SSTXN2), two SSRX+ lines (SSRXP1 and SSRXP2), two SSRX− lines (SSRXN1 and SSRXN2), two CC lines (CC1 and CC2), and two SBU lines (SBU1 and SBU2), among others.

Some USB-enabled electronic devices may be compliant with a specific revision and/or version of the USB-PD specification. The USB-PD specification defines a standard protocol designed to enable the maximum functionality of USB-enabled devices by providing more flexible power delivery along with data communications over a single USB Type-C cable through USB Type-C ports. The USB-PD specification also describes the architecture, protocols, power supply behavior, parameters, and cabling necessary for managing power delivery over USB Type-C cables at up to 100 W of power. According to the USB-PD specification, devices with USB Type-C ports (e.g., such as USB-enabled devices) may negotiate for more current and/or higher or lower voltages over a USB Type-C cable than are allowed in older USB specifications (e.g., such as the USB 2.0 Specification, USB 3.1 Specification, the USB Battery Charging Specification Rev. 1.1/1.2, etc.). For example, the USB-PD specification defines the requirements for a power delivery contract (PD contract) that can be negotiated between a pair of USB-enabled devices. The PD contract can specify both the power level and the direction of power transfer that can be accommodated by both devices, and can be dynamically re-negotiated (e.g., without device un-plugging) upon request by either device and/or in response to various events and conditions, such as power role swap, data role swap, hard reset, failure of the power source, etc. As used herein, "USB-PD subsystem" refers to one or more logic blocks and other analog/digital hardware circuitry, which may be controllable by firmware in an IC controller and which is configured and operable to perform the functions and to satisfy the requirements specified in at least one release of the USB-PD specification. The IC controller can be implemented in a USB Type-C device. The IC controller can be implemented in a USB device.

Power delivery in accordance with the USB-PD specification(s) can be embodied in several different types of USB Type-C applications. Examples of such types of Type-C applications include, but may not be limited to: a downstream facing port (DFP) application, in which an IC controller with a USB-PD subsystem is configured to provide a downstream-facing USB port (e.g., in a USB-enabled host device); an upstream facing port (UFP) application, in which an IC controller with a USB-PD subsystem is configured to provide an upstream-facing USB port (e.g., in a USB-enabled peripheral device or adapter); a dual role port (DRP) USB application, in which an IC controller with a USB-PD subsystem is configured to support both DFP and UFP applications on the same USB port (e.g., a USB Type-C port that is configured to operate as either a power provider or a power consumer or can alternate between these two roles dynamically by using USB-PD power role swap); and an active cable application, in which an IC controller with a USB-PD subsystem is disposed into, and configured to operate, an electronically marked cable assembly (EMCA) Type-C cable.

A USB-C/PD power supply can be used to deliver power with a wide output voltage range of 3.3V-21.5V, a wide current range of 1 A-5 A, and a wide input supply voltage range of 5.0V to 24V, as per USB-C/PD protocol. Due to this wide voltage/current range for USB-C power delivery and rapid switching requirements between input and output voltage signals, a buck-boost (BB) converter can be employed within a USB Type-C controller, which can be controlled to provide power to expected output loads.

Figure 1:
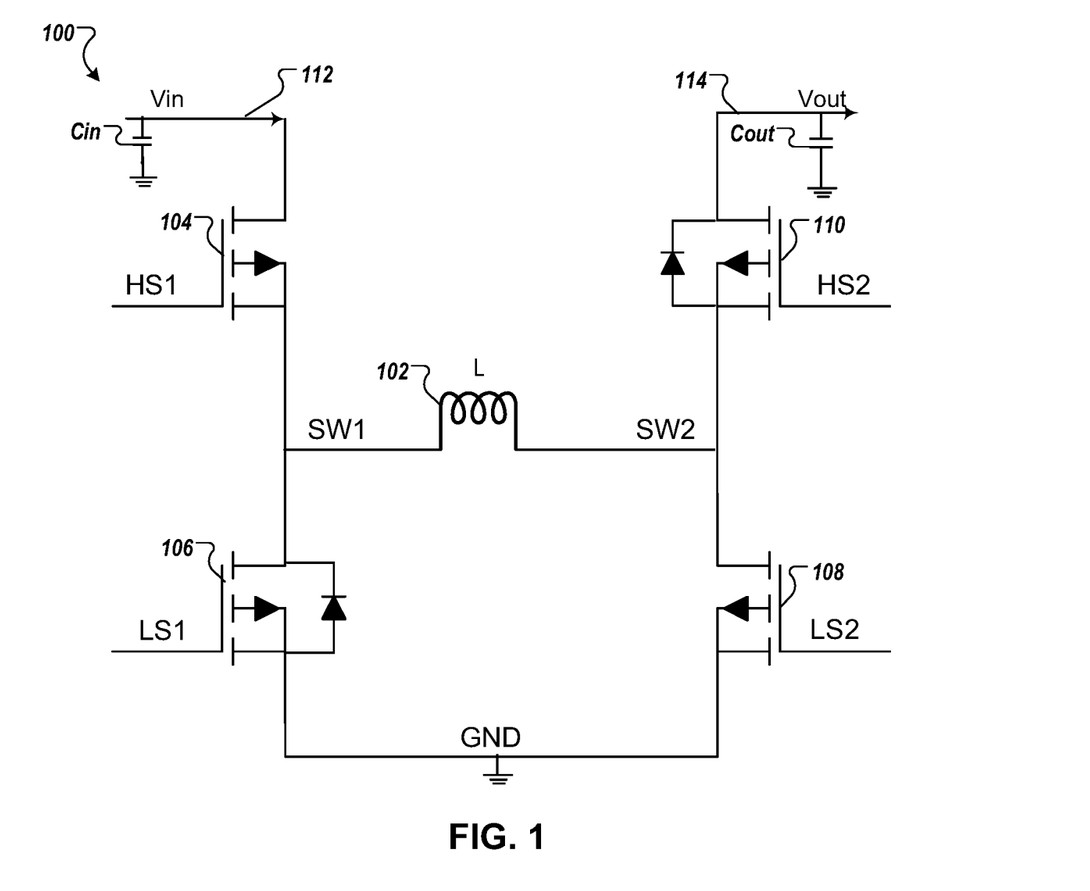
FIG. 1 is a schematic diagram of a buck-boost converter in at least one embodiment.

FIG. 1 is a schematic diagram of a BB converter 100 in at least one embodiment. The BB converter 100 includes an inductor 102, a first high-side switch 104 (or HS1), a second high-side switch 110 (or HS2), a first low-side switch 106 (or LS1), and a second low-side switch 108 (or LS2). In one embodiment, these switches are n-type field effect transistors (NFETs), as illustrated. In another embodiment, although not illustrated, the high side switches are p-type field effect transistors (PFETs). In various embodiments, the first high-side switch 104 is coupled between an input terminal 112 and a first side of the inductor 102 of the buck-boost converter 100. The high-side switch 110 is coupled between a second side of the inductor 102 and an output terminal 114. The first low-side switch 106 is coupled between the first side of the inductor 102 and a ground of the buck-boost converter 100. The second low-side switch 108 is coupled between the second side of the inductor and the ground. The input terminal 112 can carry an input voltage (Vin) and the output terminal can carry an output voltage (Vout) of the BB converter 100. The BB converter 100 can further include an input capacitor (Cin) coupled to the input terminal 112 and an output capacitor (Cout) coupled to the output terminal 114.

For such a BB converter 100, the input capacitor (Cin), output capacitor (Cout), and the inductor 102 can be designed based on input, output, and load current requirements. In various embodiments, the design of the BB converter 100 (or a larger system or device that includes the BB converter 100) seeks to limit the maximum current to a certain amperage and wattage requirement. Once total output power range is known, one can determine input current requirements. From input current requirements, one can determine values for capacitance of the input and output capacitors (Cin and Cout) and for the inductance of the inductor 102.

Figure 2:
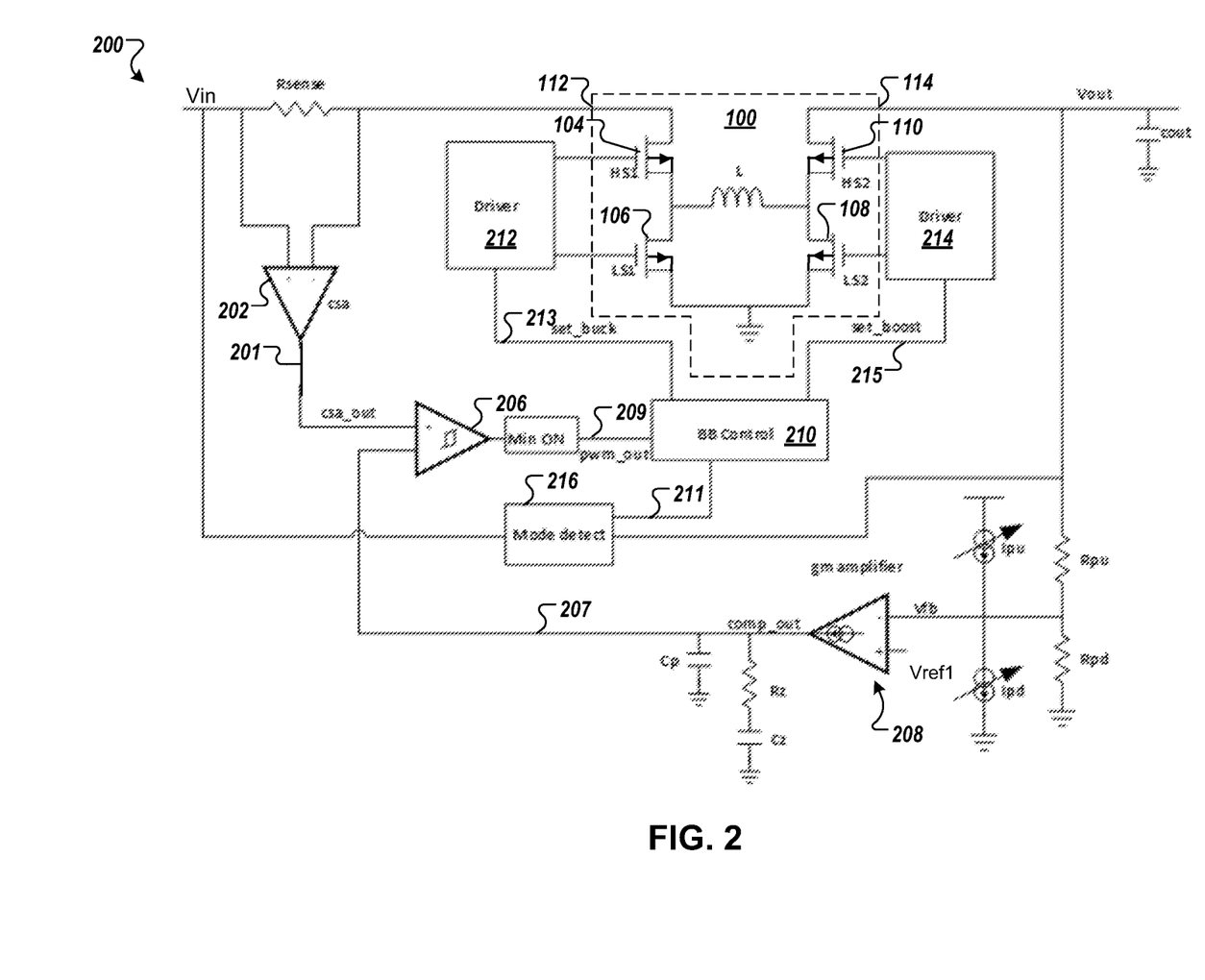
FIG. 2 is a block diagram of a USB controller that includes a buck-boost converter architecture in at least one embodiment.

FIG. 2 is a block diagram of a USB controller 200 that includes, or is coupled to, the buck-boost converter 100 in at least one embodiment. The USB controller 200 includes a current sense amplifier (CSA) 202, a comparator 206, an error amplifier (EA) 208, BB control logic 210, a driver 212, a driver 214, and mode detect logic 216. The CSA 202 can measure an input current of the buck-boost converter 100 and can output a CSA signal 201 indicative of the input current. In some embodiments, a slope compensation logic and hardware can act on the CSA signal 201 in order to add an offset signal to the CSA signal 201. Thus, the CSA signal 201 includes a slope compensation offset voltage or charge in some embodiments.

In at least one embodiment, the comparator 206 receives the CSA signal 201 and an EA signal 207 from the EA 208. The EA 208 compares the output voltage (Vout) against a reference voltage (Vref1) to generate an EA signal 207. The comparator 206 compares the CSA signal 201 and the EA signal 207 and provides a control signal 209, referred to as pulse width modulation (PWM) out (or pwm_out) signal, to the BB control logic 210. In one embodiment, the EA control loop as referred to herein refers to at least the EA 208, the CSA 202, and the comparator 206 that adjust the PWM output signal to the BB control 210 based on the input voltage (Vin), the output voltage (Vout), and the reference voltage (Vref1), the latter of which is programmable.

In various embodiments, the BB control logic 210 receives the control signal 209 and a mode signal 211 from mode detect logic 216. The mode detect logic 216 can determine a mode and a transition between modes based on the output voltage (Vout) and the input voltage (Vin), and outputs the mode signal 211 accordingly. In various embodiments, if Vin is higher than Vout, the mode detect logic 216 will output the mode signal 211 indicative of buck mode. In contrast, if Vout is higher than Vin, the mode detect logic 216 will output the mode signal 211 indicative of boost mode.

The BB control logic 210 can use the control signal 209 and the mode signal 211 to control a mode of the buck-boost converter 100. In particular, the BB control logic 210 can send a first control signal 213 (set_buck) to the driver 212 that controls the first high-side switch 104 and the first low-side switch 106 of the buck-boost converter 100. The BB control logic 210 can further send a second control signal 215 (set_boost) to the driver 214 that controls the second high-side switch 110 and the second low-side switch 108 of buck-boost converter 100.

Figure 3A:
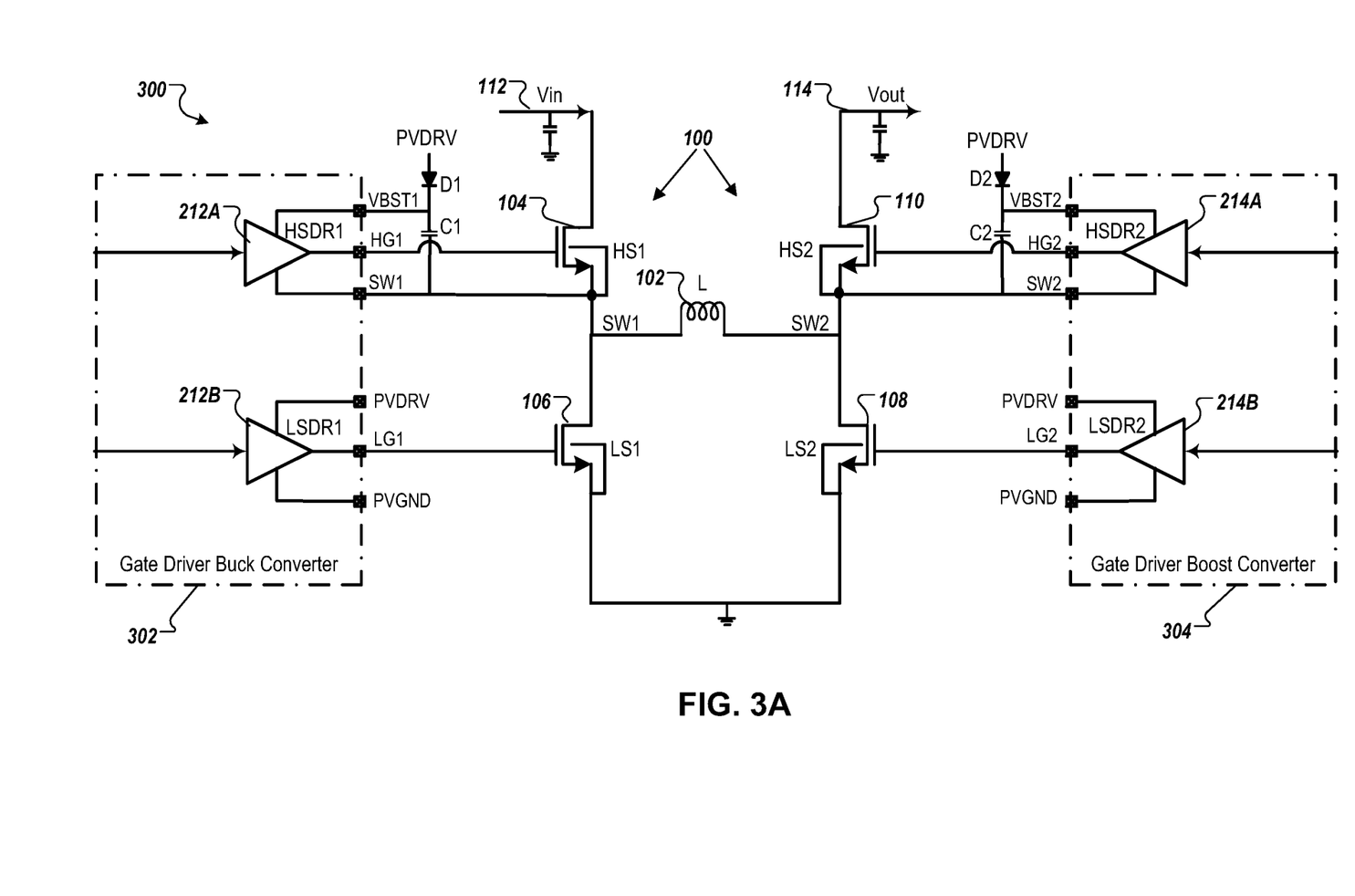
FIG. 3A is a block diagram of a USB controller that includes a gate driver buck converter and a gate driver boost converter for the buck-boost converter in at least one embodiment.

FIG. 3A is a block diagram of a USB controller 300 that includes a gate driver buck converter 302 and a gate driver boost converter 304 for the buck-boost converter 100 in at least one embodiment. In some embodiments, the driver 212 (FIG. 2) is or includes the gate driver buck converter 302 and the driver 214 (FIG. 2) is or includes the gate driver boost converter 304.

In some embodiments, the gate driver buck converter 302 includes a first high-side driver 212A and a first low-side driver 212B of the buck-boost converter 100. The first high-side driver 212A can be powered between a first bootstrap voltage (VBST1) and a first output voltage (SW1) of the first high-side switch 104 driven by an output (HG1) of the first high-side driver 212A.

The USB controller 300 can further include a first diode (D1) coupled to a driver power supply (PVDRV), e.g., a driver supply voltage. In one embodiment, the first diode (D1) is a first Schottky diode to enable protecting the buck-boost converter 100 and the gate driver buck converter 302 from PVDRV over-voltage. In one embodiment, the driver power supply provides approximately 5 volts (V), although other voltages are envisioned. The USB controller 300 can further include a first capacitor (C1) to provide VBST1. A first terminal of the first capacitor is coupled to the first diode and to a VBST1 terminal of the gate driver buck converter 302. A second terminal of the first capacitor is coupled to a switch pin (SW1) of the gate driver buck converter 302, the switch pin (SW1) being coupled to the first output voltage. In these embodiments, the first low-side driver 212B is powered between the driver power supply (PVDRV) and driver ground supply (PVGND) and provides an output (LG1) that drives the first low-side switch 106.

In some embodiments, the gate driver boost converter 304 includes a second high-side driver 214A and a second low-side driver 214B of the buck-boost converter 100. The second high-side driver 214A can be powered between a second bootstrap voltage (VBST2) and a second output voltage (SW2) of the second high-side switch 110 driven by an output (HG2) the second high-side driver 214A.

The USB controller 300 can further include a second diode (D2) coupled to the driver power supply (PVDRV). In one embodiment, the second diode (D2) is a second Schottky diode to enable protecting the buck-boost converter 100 and the gate driver boost converter 304 from PVDRV over-voltage. The USB controller 300 can further include a second capacitor (C2) to provide VBST2. A first terminal of the second capacitor can coupled to the second diode and a VBST2 terminal of the gate driver boost converter 304. A second terminal of the second capacitor can be coupled to a switch pin (SW2) of the gate driver boost converter 304, the switch pin (SW2) being coupled to the second output voltage. In these embodiments, the second low-side driver 214B can be powered between the driver power supply (PVDRV) and the driver ground supply (PVGND) and provides an output (LG2) that drives the second low-side switch 108.

In various embodiments, the power supply voltage (PVDRV) charges the first capacitor (C1) in order to provide the first bootstrap voltage, VBST1, and charges the second capacitor (C2) in order to provide the second bootstrap voltage, VBST2. With reference to the buck-boost converter 100, during buck mode (where Vin is greater than Vout), the second high-side switch 110 is always ON (e.g., asserted) and the second high-side driver 214A operates on the second bootstrap voltage, VBST2, with respect to a floating ground at SW2. Leakages from the second capacitor (C2) can cause the second bootstrap voltage VBST2 to droop with respect to SW2 during buck mode, which can cause the second high-side switch 110 to malfunction or lower drive strength, causing efficiency losses. Further, during buck mode, the first high-side switch 104 and the first low-side switch 106 alternate ON/OFF every cycle, e.g., so that the voltage at SW1 can discharge through the first low-side switch 106 every other cycle.

Similarly, during boost mode (where Vout is greater than Vin), the first high-side switch 104 is always ON (e.g., asserted) and the first high-side driver 212A operates on the first bootstrap voltage source, VBST1, with respect to a floating ground at SW1. Leakages from the first capacitor (C1) can cause the first bootstrap voltage, VBST1, to droop with respect to SW1 during boost mode, which can cause the first high-side which 104 to malfunction or lower drive strength, causing efficiency losses. Further, during boost mode, the second high-side switch 110 and the second low-side witch 108 alternate ON/OFF every cycle, e.g., so that the voltage at SW2 can discharge through the second low-side switch 108 every other cycle.

In these embodiments, the bootstrap voltage (whether VBST2 in buck mode or VBST1 in boost mode) is refreshed or recharged when the bootstrap voltage drops below a predefined under-voltage threshold to ensure that the high-side switch (HS1 in boost mode and HS2 in buck mode) is turned-on with sufficient gate-to-source voltage ($V_{GS}$) to meet a drain-source resistance (RDS) of the external high-side switch (HS1, HS2) required for optimal efficiency. This RDS is thus the resistance of each of the first and second high-side switches 104, 110 when ON and operating in the linear region of the NFET (or PFET). Thus, the $V_{GS}$ can be ensured to operate the first and second high-side switches 104, 110 at optimum RDS via refreshing the bootstrap voltages VBST1 and VBST2, respectively.

In some USB controllers, the above-described bootstrap voltage refresh has been performed using two dedicated charge pumps and associated switching electronics (e.g., additional gates and multiplexers), one charge pump coupled to the first capacitor (C1) to refresh VBST1 and a second charge pump coupled to the second capacitor (C2) to refresh VBST2. Disadvantageously, this solution requires additional charge pumps, associated electronics, to include a 40V-tolerant on-chip diode and a large 40V-tolerant capacitor for each charge pump, all which add area and bill of materials costs. Further, these additional charge pumps take additional current, thus requiring a higher power for operation leading to non-optimal efficiency for the buck-boost converter 100.

These and other deficiencies that will be apparent to those skilled in the art are overcome in some embodiments of the techniques described herein by adding circuitry (e.g., CMOS-based circuitry) that can detect the predefined under-voltage threshold in both of the VBST1 (in boost mode) and VBST2 (in buck mode), and then shift voltage between VBST2 to VBST1 (in boost mode) and between VBST1 and VBST2 (in buck mode) in order to perform the bootstrap voltage refresh as will be described in detail with reference to FIGS. 3B-6. This approach can work because VBST2 is always higher than VBST1 in boost mode (due to the second high-side switch 110 toggling ON/OFF between cycles) and VBST1 is always higher than VBST2 in buck mode (due to the first high-side switch 104 toggling ON/OFF between cycles). This CMOS-based circuitry can be integrated into the USB controller 200, as will be discussed, taking up much less area with far fewer costs and power requirements when compared with previous solutions.

Figure 3B:
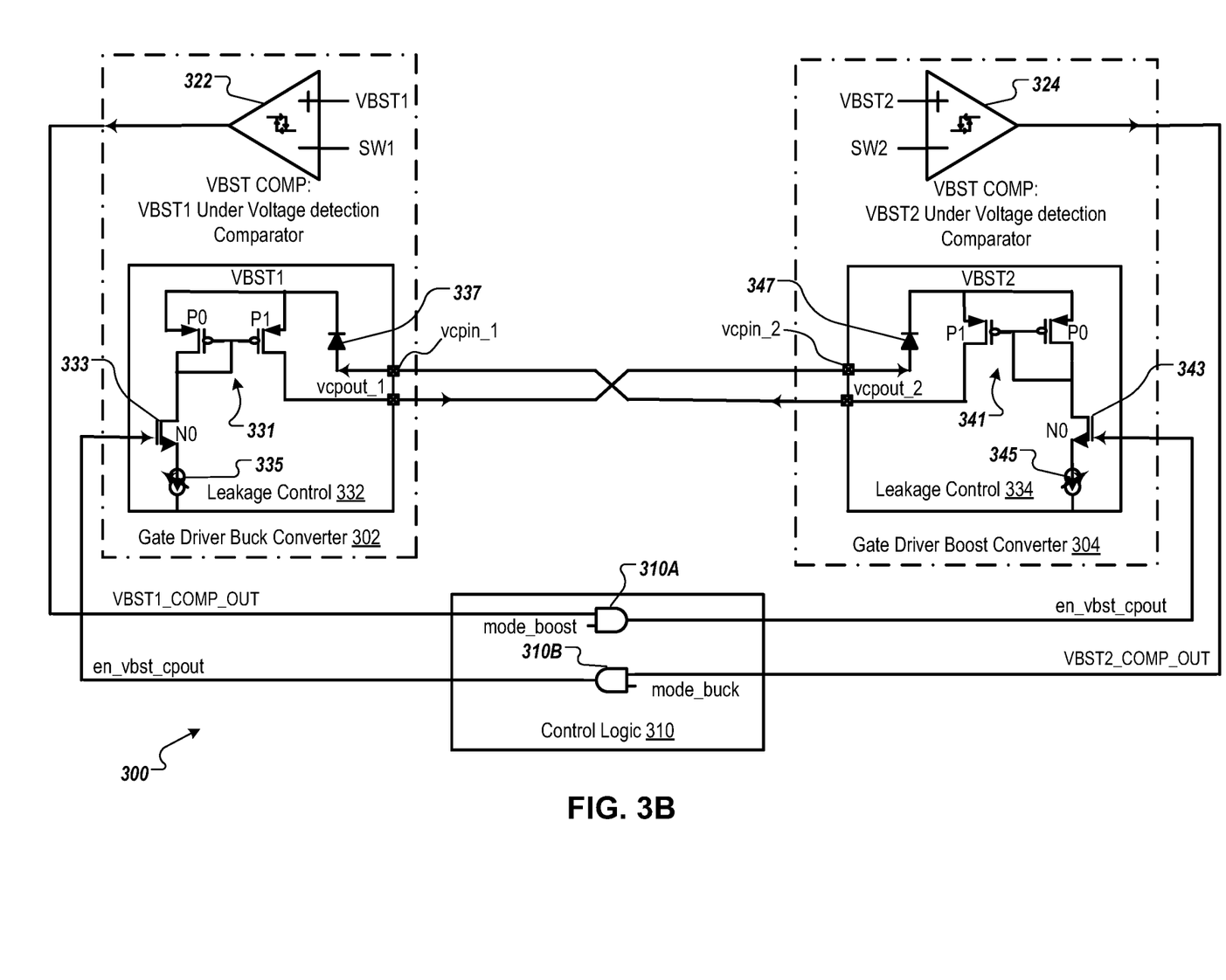
FIG. 3B is a block diagram of the USB controller of FIG. 3A illustrating details of bootstrap voltage refresh for the buck-boost converter in at least one embodiment.

FIG. 3B is a block diagram of the USB controller 300 of FIG. 3A illustrating details of bootstrap voltage refresh for the buck-boost converter in at least one embodiment. FIG. 3B explains a method of charging VBST1 and VBST2 through a current charging mechanism. In some embodiments, the gate driver buck converter 302 further includes a first comparator 322 to detect VBST1 drop below a threshold value (e.g., the predefined under-voltage threshold) with respect to the first output voltage (SW1) when the buck-boost converter 100 is in boost mode. The gate driver buck converter 302 can further include a first leakage control circuit 332 to boost, using VBST2 as a voltage source, VBST1 each cycle of boost mode in which an output of the comparator 322 is enabled and detects the under-voltage condition on VBST1.

In some embodiments, the gate driver boost converter 304 further includes a second comparator 324 to detect VBST2 drop below the threshold value with respect to the second output voltage (SW2) when the buck-boost converter 100 is in buck mode. The gate driver boost converter 304 can further include a second leakage control circuit 334 to boost, using VBST1 as a voltage source, VBST1 each cycle of boost mode in which an output of the first comparator 324 is enabled and detects the under-voltage condition on VBST2.

In some embodiments, each of the first comparator 322 and the second comparator 324 are configured as illustrated and discussed with reference to FIG. 4. Further, the first leakage control circuit 332 can include a first current mirror 331 (e.g., comprised of PFETs P0 and P1) coupled to VBST1 and having an output coupled to a second input pin (vcpin_2) of the second leakage control circuit 334 that is coupled to VBST2. The first leakage control circuit 332 can further include a first field-effect transistor (FET) 333 (e.g., NFET N0) coupled between the first current mirror 331 and a first variable-controlled current source 335. A gate of the first FET 333 is to receive a signal from control logic 310 indicative of the second comparator 324 being enabled during buck mode. In some embodiments, the first leakage control circuit 322 further includes a first diode 337 (e.g., a Schottky diode or an active diode) coupled between VBST1 and a first input pin (vcpin_1). The first diode 337 can prevent backflow of current from VBST1 to the second leakage control circuit 334 when the first leakage control circuit 332 is in "de-boost" phase, e.g., providing voltage to VBST2 during buck mode.

Additionally, the second leakage control circuit 334 can include a second current mirror 341 (e.g., comprised of PFETs P0 and P1) coupled to VBST2 and having an output coupled to the first input pin (vcpin_1) of the first leakage control circuit 332 that is coupled to VBST1. The second leakage control circuit 334 can further include a second field-effect transistor (FET) 343 (e.g., NFET N0) coupled between the second current mirror 341 and a variable-controlled current source 345. A gate of the second FET 343 can receive a signal from the control logic 310 indicative of the first comparator 322 being enabled during boost mode. In some embodiments, the second leakage control circuit 334 further includes a second diode 347 (e.g., a Schottky diode or an active diode) coupled between VBST2 and the second input pin (vcpin_2). The second diode 347 can prevent backflow of current from VBST2 to the first leakage control circuit 332 when the second leakage control circuit 334 is in "de-boost" phase, e.g., providing voltage to VBST1 during boost mode. In some embodiments, each of the first leakage control circuit 332 and the second leakage control circuit 334 is implemented as illustrated and discussed with reference to FIG. 5.

In various embodiments, the control logic 310 is included in the BB control logic 210 of FIG. 2. In other embodiments, the control logic 310 is stand-alone control logic within the USB controller 300. The control logic 310, for example, can include a first AND gate 310A having first inputs including a boost mode detect signal and an output of the first comparator 322; and a first output coupled to the second leakage control circuit 334 to trigger the boost of VBST1 during boost mode. The first output can be provided to the gate of the second NFET 343. The control logic 310 can further include a second AND gate 310B having second inputs including a buck mode detect signal and an output of the second comparator 324; and a second output coupled to the first leakage control circuit 332 to trigger the boost of VBST2 during buck mode. The second output can be provided to the gate of the first NFET 335. In these embodiments, the mode detect logic 216 can provide each of the boost mode detect signal and the buck mode detect signal based on the output of the mode detect logic 216.

Figure 4:
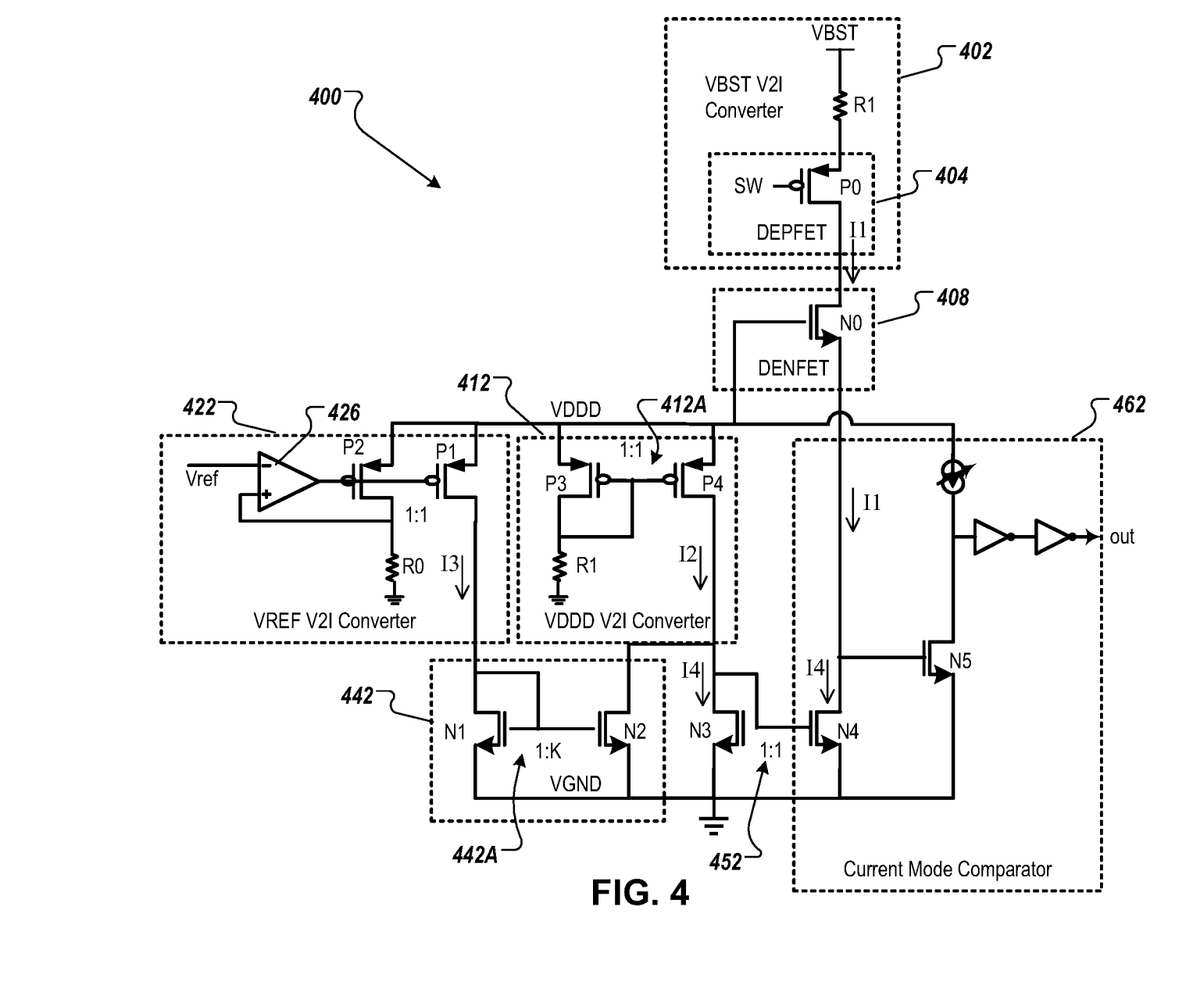
FIG. 4 is a block diagram of an under-voltage detection comparator illustrated in FIG. 3B in at least one embodiment.

FIG. 4 is a block diagram of an under-voltage detection comparator 400 illustrated in FIG. 3B in at least one embodiment. For example, the under-voltage detection comparator 400 (or just comparator 400 for simplicity) can be either of the first comparator 322 (to compare with VBST1) or the second comparator 324 (to compare with VBST2). In various embodiments, the comparator 400 includes a bootstrap voltage-to-current converter 402 to convert VBST1 (or VBST2) to a first current (I1). The comparator 400 can further include a supply voltage-to-current converter 412 to convert a supply voltage to a second current (I2). The supply voltage, or VDDD, can be an internal power supply voltage of a circuit, e.g., 5V on-chip supply voltage. The comparator 400 can further include a reference voltage-to-current converter 422 to convert a reference voltage (Vref), which has a threshold value that is programmable, to a third current (I3). The threshold value can be associated with the defined under-voltage threshold voltage for which the comparator 400 is performing the comparison to a difference between VBST and SW.

The comparator 400 can further include a current multiplier 442 to generate an adjusted third current by multiplying the current multiplier ("K") by the third current. The comparator 400 can further include a current mirror 452 to generate a fourth current (I4), e.g., that is the second current less the adjusted third current. The comparator 400 can further include a current mode comparator 462, which includes an output switch (e.g., NFET N4) of the current mirror 452 and that receives the first current, to enable the output of the comparator in response to the first current dropping below the fourth current. In other words, the trip point of the comparator is I1=I2−K*I3=I4, where the NFET (N2) of the current multiplier 442 can be programmed with a threshold voltage to set the value of "K." The undervoltage detection threshold can be programmed by changing the value of K through embedded firmware or the BB control logic 210.

In some embodiments, the bootstrap voltage-to-current converter 402 includes a first resistor (R1) having a first resistance coupled in series with a p-type extended drain field-effect transistor (DEPFET) 404, where a gate of the DEPFET is coupled with the output voltage, SW (e.g., first output voltage, SW1, to be compared with VBST1 or second output voltage, SW2, to be compared with VBST2). The DEPFET 404 can be a high-voltage PFET that can handle voltages up to 40V or more, to protect the comparator 400 from the VBST voltage level. The bootstrap voltage-to-current converter 402 can convert the differential voltage between VBST and SW to the first current (I1) using the resistance of the first resistor R1 and the DEPFET 404, as illustrated. More specifically, I1=(VBST−SW−Vtp)/R1, where Vtp is the threshold voltage of the DEPFET 404.

The comparator 400 can further include an n-type extended drain field-effect transistor (DENFET) 408 having: a first gate coupled to the supply voltage; a first drain coupled to an output of the DEPFET 404; and a source coupled to an output of the current mirror 452. The DENFET 408 can be a high-voltage NFET that can handle voltages up to 40V, to also protect the comparator 400 components from the VBST voltage level. Further, the current mode comparator 462 can further include another n-type field effect transistor (NFET), N5, having: a second gate coupled to the source of the DENFET 408 and to a drain of the output switch (N4); a second drain coupled to the current source (which is coupled to the supply voltage); and a second source coupled to ground (GND).

In some embodiments, the current multiplier 442 includes a current mirror 442A having a pair of gate-coupled transistors (N1, N2). The comparator 400 can further include BB control logic 210 or embedded firmware adapted to program the current multiplier 442A (e.g., to set the value of "K") by setting a threshold voltage (Vth) of an output transistor (e.g., NFET N2) of the gate-coupled transistors.

In various embodiments, the supply voltage-to-current converter 412 includes a current mirror 412A coupled in series to a resistor (also R1). The second current (I2) output from the supply voltage-to-current converter 412 can be sent to the current mirror 452. The supply voltage-to-current converter 412 can convert the differential voltage between VDDD and VGND to the second current using resistance of the resistor, R1, and the PFETs P3 and P4 of the current mirror 412A. More specifically, I2=(VDDD−Vtp)/R1, where Vtp is the threshold voltage of PFET P3 of the current mirror 412A.

In some embodiments, the reference voltage-to-current converter 422 includes: a first p-type field-effect transistors (PFET), P1, coupled between the voltage supply (VDDD) and a first NFET (N1) of the current multiplier 442. The reference voltage-to-current converter 422 can further include a second PFET, P2, coupled between the supply voltage and a resistor (R0). The reference voltage-to-current converter 422 can further include a second comparator 426 having a negative terminal coupled to the reference voltage (Vref), a positive terminal coupled to an output of the second PFET, P2, and a comparator output coupled to gates of the first PFET (P1) and the second PFET (P2). The reference voltage-to-current converter 422 can convert the voltage on Vref to the third current (I3) using resistance of resistor R0 and the first and second PFETs P1 and P2. More specifically, I3=Vref/R0.

As discussed, at the trip voltage for the comparator 400, I1=I2−K*I3=I4. Thus, the differential of VBST−SW can be set equal to VDDD−K*Vref*R1/R0. In this way, the output of the comparator 400 indicates that an under-voltage condition is detected when the VBST−SW differential drops below VDDD by K*Vref*R1/R0. Another way to state this is the under-voltage condition is detected when the first current (I1) drops below the fourth current (I4), e.g., which turns off the NFET N5 of the current mode comparator.

Figure 5:
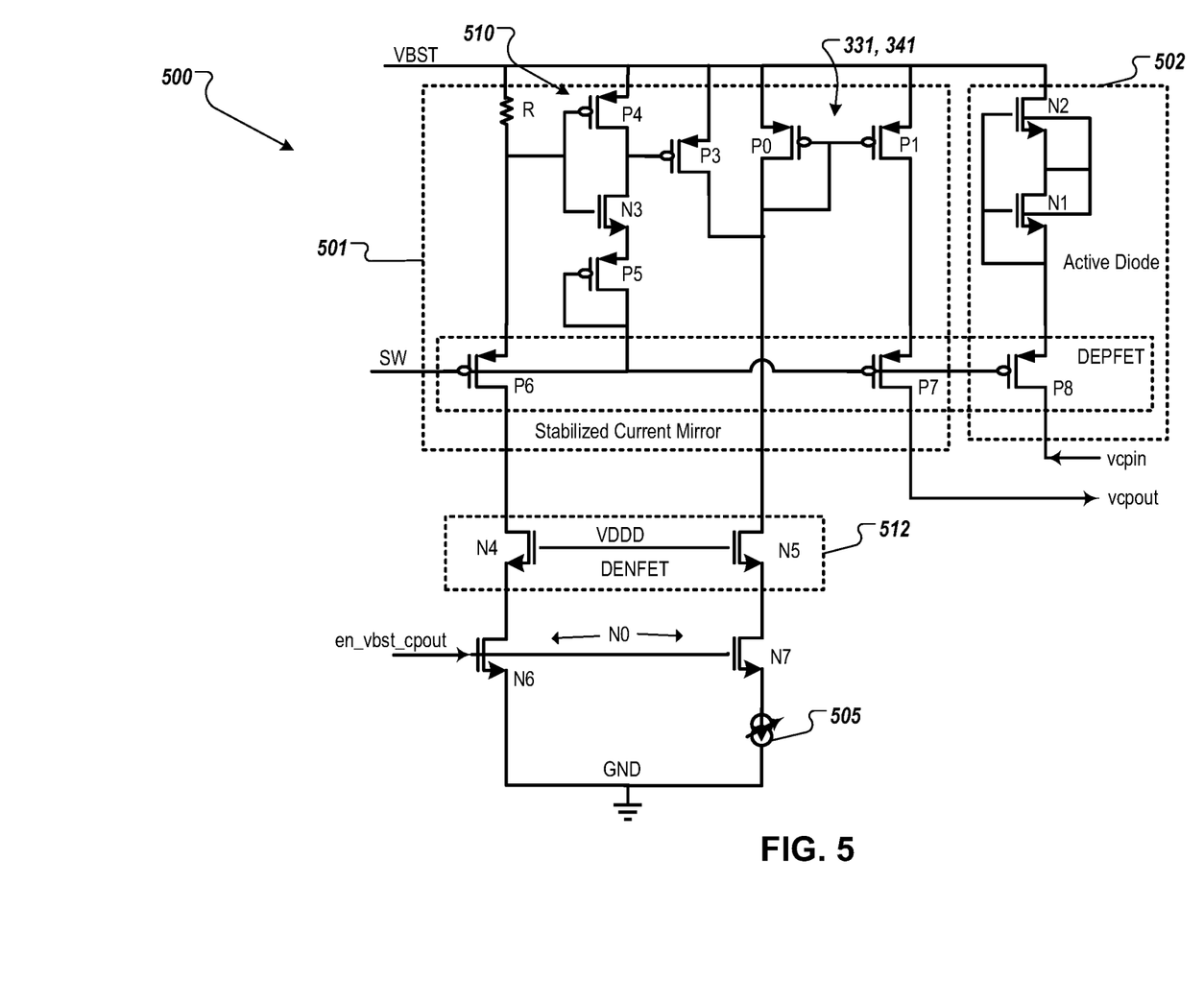
FIG. 5 is a block diagram of a leakage control circuit illustrated in FIG. 3B in at least one embodiment.

FIG. 5 is a block diagram of a leakage control circuit 500 illustrated in FIG. 3B in at least one embodiment. For example, the leakage control circuit 500 can be either of the first leakage control circuit 332 or the second leakage control circuit 334. The leakage control circuit 500 can include a stabilized current mirror 501 (e.g., a stabilizer circuit) coupled between VBST and an output pin (vcpout) to stabilize the voltage provided from VBST of the leakage control circuit 500 to the VBST of another leakage control circuit. The leakage control circuit 500 can further include an active n-type metal-oxide semiconductor (NMOS) diode 502 coupled between VBST and the input pin (vcpin) of the leakage control circuit 500 in order to prevent backwards flow of current during "de-boost" phase. The "de-boost" phase can be understood to be when the BB control logic 210 turns on the first low-side switch 106 in buck mode or turns on the second low-side switch 108 in boost mode. For example, in the deboost phase of buck mode, back current is stooped from VBST2 to VBST1, as in the buck mode, the comparator 400 wants to charge VBST2 from VBST1. In the deboost phase of buck mode, VBST1 is at a lower potential than VBST2 (due to first low-side switch 106 being turned on) and hence stopping this back current from VBST2 to VBST1 prevents VBST2 from collapsing or giving back the boosted voltage to VBST1. An opposite action occurs in the deboost phase of the boost mode.

In some embodiments, the active NMOS diode 502 is not a parasitic bipolar junction (BJT), but is actively controlled to avoid latch-up and parasitic BJT formation during 40V switching by using an active MOS-based implementation. More specifically, the active NMOS diode 502 can include a pair of self-biased NFETs (N1, N2) connected in series and coupled to VBST, which can be either VBST2 or VBST1. The active NMOS diode 502 can further include a (first) p-type drain extended field-effect transistor (DEPFET), P8, connected in series between the pair of self-biased NFETs and a second input pin that receives voltage from another VBST (e.g., from VBST1 or VBST2, respectively). A gate of the DEPFET can receive the output voltage (SW) of one of the first or second high-side switch 104 or 110. The DEPFET P8 can be a high-voltage PFET that can handle up to a 40V drop across the DEPFET. In another embodiment, the DEPFET is replaced with an DENFET and the pair of self-biased NFETs is replaced with a pair of self-biased PFETs.

The active NMOS diode 502, by structural and electrical design, is configured to conduct current from the input pin (vcpin) to VBST when there is a boost cycle from another VBST that is higher than the VBST of the leakage control circuit 500, e.g., from VBST2 to VBST1 during boost mode or from VB to VBST2 during buck mode. Once the voltage at the input pin (vcpin) drops lower than the voltage at the VBST node, the gates of the pair of self-biased NFETs (N1 and N2) are turned OFF due to operating a diode-connected configuration. Turing off the pair of self-biased NFETs prevents discharge of voltage from VBST through the DEPFET P8, thus acting as an active NMOS diode.

In some embodiments, the first current mirror 331 or the second current mirror 341 (from FIG. 3B) is the current mirror comprised of PFETs P0 and P1 in FIG. 5. For simplicity of explanation, consider PFETs P0 and P1 to be the first current mirror 331. The stabilized current mirror 501 can include or be coupled to this first current mirror 331 and function to stabilize the output provided to the output pin (vcpout). The first NFET 333 (FIG. 3B) can be understood to now be the NFET N7 coupled between the first current mirror 331 and a variable-controlled current source 505, which is coupled to ground (GND). A gate of the NFET N7 can be adapted to receive a signal from the control logic 310 indicative of the comparator of the other converter (e.g., gate driver buck converter 302 or gate driver boost converter 304) being enabled in buck (or boost) mode, respectively.

The leakage control circuit 500 can further include a pair of drain-extended n-type field-effect transistors (DENFETs) (e.g., N4 and N5) connected in a high-voltage current mirror 512 and coupled between the first current mirror and ground. Each of the DENFETs N4 and N5 can handle up to a 40V drop across each DENFET. Gates of the DENFETs N4 and N5 can be driven by VDDD to keep the DENFETs N4 and N5 activated. A second NFET, N6, is coupled between a first DENFET (N4) of the pair of DENFETs and the ground. The first NFET, N7, is coupled between a second DENFET (N5) of the pair of DENFETs and the ground, e.g., via the variable-controlled current source 505. A gate of each of the first NFET (N7) and the second NFET (N6) can be configured to receive the signal (en_vbst_cpout) from the control logic 310 indicative of the comparator of the other converter (e.g., gate driver buck converter 302 or gate driver boost converter 304) being enabled in buck (or boost) mode, respectively.

In various embodiments, the stabilized current mirror 501 (e.g., stabilizer circuit) is coupled between the first current mirror 331 and the pair of DENFETs N4 and N5. This stabilized current mirror 501 can include a resistor (R) coupled to VBST and a second DEPFET P6 coupled between the resistor, R, and the first DENFET, N4. The stabilized current mirror 501 can further include a chain of stabilizing FETs 510 (e.g., PFETs P3, P4, P5, and NFET N3) coupled between gates of the first current mirror 331, VBST, the resistor, R, and the output voltage (SW) of one of the first or the second high-side switch 104 or 110. The stabilized current mirror 501 can further include a third DEPFET P7 coupled between an output of the first current mirror 331 and the output pin, vcpout. The output pin can be coupled to the input pin of the other leakage control circuit, where gates of the second DEPFET P6 and the third DEPFET P7 are to receive the output voltage (SW) of one of the first or second high-side switch 104 or 110.

Figure 6:
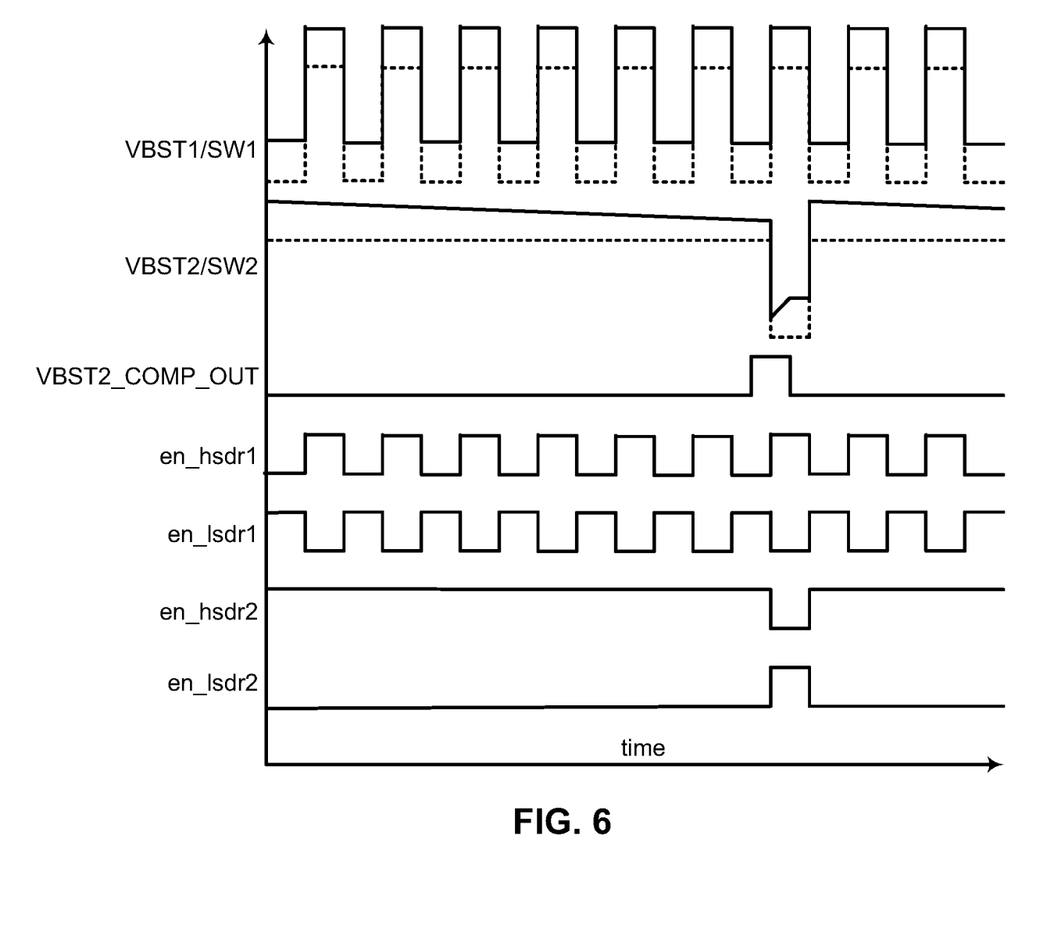
FIG. 6 is a timing diagram of control signals to switches of the buck-boost converter of FIGS. 1-3A and corresponding bootstrap voltages of the USB controller in at least one digital refresh embodiment while in buck mode.

FIG. 6 is a timing diagram of control signals to switches of the buck-boost converter of FIGS. 1-3A and corresponding bootstrap voltages of the USB controller in at least one digital refresh embodiment while in buck mode. This is an alternate way to refresh the voltages on VBST1 and VBST2 by using outputs of the under-voltage first and second comparators 322 and 324. In various embodiments, the under-voltage comparator (e.g., the first comparator 322 or the second comparator 324) can monitor the VBST voltage (e.g., VBST1 or VBST2) with respect to a corresponding SW node (e.g., SW1 or SW2), respectively. When the USB controller 300 enters into a buck-boost switching cycle, the SW node is brought to PVGND and the VBST is charged on the external bootstrap capacitor (e.g., on C1 or C2, respectively for VBST1 or VBST2) via the first diode (D1) or second diode (D2), respectively. Once the control logic 310 detects an output enabled of one of the first comparator 322 or the second comparator 324, the control logic 310 causes each of the first high-side driver 104, the first low-side driver 106, the second high-side driver 110, and the second low-side driver 108 to toggle an output in response to the detection. In this way, the VBST node that has drooped below the threshold value is automatically refresh by general toggling of the switches of the buck-boost converter 100.

With additional reference to FIG. 6, the signal to the first high-side driver 212A is en_hsdr1, the signal to the first low-side driver 212B is en_lsdr1, the signal to the second high-side driver 214A is en_hsdr2, and the signal to the second low-side driver 214B is en_lsdr2. The top graph is an output of VBST1 (solid line) superimposed over SW1 (dotted line) in buck mode and the graph below the top graph is an output of VBST2 (solid line) superimposed over SW2 (dotted line) in buck mode. The output of the second comparator 324, or VBST2_COMP_OUT, is illustrated in the middle of the timing diagram. As can be observed, once the second comparator output is triggered (indicating an under-voltage condition of VBST2), the BB control logic 210 causes the signals en_hsdr1, en_lsdr1, en_hdsr2, and en_lsdr2 to be toggled one time to thus refresh VBST2 to its starting level when the buck-boost converter 100 entered buck mode. Once the VBST2 is recharged and the BB control logic 210 detects the output of the second comparator 324 be deasserted (e.g., go low), BB the control logic 210 can cause the buck-boost converter 100 to re-enter buck mode.

Similarly, although not illustrated in the graph of FIG. 6, when the buck-boost converter 100 is operating in boost mode, once the output (VBST1_COM_OUT) of the first comparator 322 is triggered indicating an under-voltage condition of VBST1, the BB control logic 210 causes the signals en_hsdr1, en_lsdr1, en_hdsr2, and en_lsdr2 to be toggled one time to thus refresh VBST1 to its starting level when the buck-boost converter 100 entered boost mode. Once the VBST1 is recharged and the BB control logic 210 detects the output of the first comparator 322 be deasserted (e.g., go low), the control logic 310 can cause the buck-boost converter 100 to re-enter boost mode.

The various disclosed embodiments include various advantages over the previous solutions in at least not requiring a 40V on-chip charge pump, no latch-up risk, and less active current (ICC). This lowers chip area and improves power performance. That the under-voltage comparators can operate with low operating current consumption from the floating supply voltage (VBST) already available in the USB controller 300 also improves power performance. The threshold value (e.g., Vref of the reference voltage-to-current converter 422) and the value "K" of the current multiplier 442 are programmable (through embedded firmware or the BB control logic 210) for the VBST comparator, e.g., the comparator 400 of FIG. 4, which provides better efficiency that can be optimized for a given application. Because there is no switching involved from a charge pump, and charging the capacitors C1 and C2 is performed smoothly, results in better electromagnetic interference (EMI) and electromagnetic compatibility (EMC) performances, as VBST1 and VBST2 are refreshed through current charging. Further, the on-chip active NMOS diode 502 in the leakage control circuit 500 (FIG. 5) using native NMOS can prevent parasitic BJT formation, thus there is not latch-up risk for the CMOS process. Additionally, no additional external discrete components are added or needed. Further, the digital solution of FIG. 6 is a scalable architecture with very low area consumption to implement, e.g., only a little additional logic within the BB control logic 210.

Figure 7:
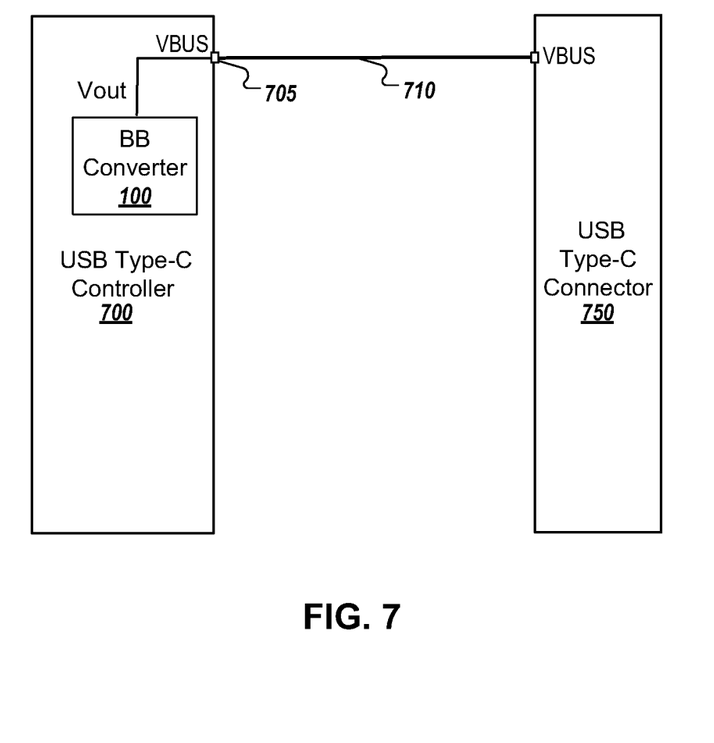
FIG. 7 is a block diagram of a USB Type-C controller that includes the buck-boost converter of FIGS. 1-3A in at least one embodiment.

FIG. 7 is a block diagram of a USB Type-C controller 700 that includes the buck-boost converter 100 of FIGS. 1-3A in at least one embodiment. The USB Type-C controller 700 can further include a VBUS terminal 705, which is coupled to a VBUS line 710 and the buck-boost converter 100. The VBUS line 710 can further be coupled to a USB Type-C connector 750 that connected to a USB cable for example. In one embodiment, the VBUS line 710 is a part of the USB Type-C connector 750. In some embodiments, the USB Type-C controller 700 is the USB controller 300 of FIGS. 3A-3B, which expands on the USB controller 200 of FIG. 2.

Various embodiments of the bootstrap voltage refresh of buck-boost converters for USB-C controllers described herein may include various operations. These operations may be performed and/or controlled by hardware components, digital hardware and/or firmware, and/or combinations thereof. As used herein, the term "coupled to" may mean connected directly to or connected indirectly through one or more intervening components. Any of the signals provided over various on-die buses may be time multiplexed with other signals and provided over one or more common on-die buses. Additionally, the interconnection between circuit components or blocks may be shown as buses or as single signal lines. Each of the buses may alternatively be one or more single signal lines and each of the single signal lines may alternatively be buses.

Certain embodiments may be implemented by firmware instructions stored on a non-transitory computer-readable medium, e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for USB-C mode-transition architecture described herein. The non-transitory computer-readable storage medium may include, but is not limited to, electromagnetic storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An apparatus comprising:
    a first high-side driver of a buck-boost converter, the first high-side driver powered between a first bootstrap voltage (VBST1) of a first capacitor and a first output voltage of a first high-side switch driven by the first high-side driver;
    a second high-side driver of the buck-boost converter, the second high-side driver powered between a second bootstrap voltage (VBST2) of a second capacitor and a second output voltage of a second high-side switch driven by the second high-side driver;
    a comparator to detect VBST1 drop below a threshold value with respect to the first output voltage when the buck-boost converter is in boost mode; and
    a leakage control circuit to boost, using VBST2 as a voltage source, VBST1 each cycle of boost mode in which an output of the comparator is enabled.

2. The apparatus of claim 1, wherein the comparator is a first comparator and the leakage control circuit is a second leakage control circuit comprising:
- a current mirror coupled to VBST2 and having an output coupled to an input pin of a first leakage control circuit that is coupled to VBST1; and
- a field-effect transistor (FET) coupled between the current mirror and a variable-controlled current source, wherein a gate of the FET is to receive a signal from control logic indicative of the first comparator being enabled during boost mode.

3. The apparatus of claim 1, wherein the comparator is a first comparator and the leakage control circuit is a second leakage control circuit, the apparatus further comprising:
- a second comparator to detect VBST2 drop below the threshold value with respect to the second output voltage when the buck-boost converter is in buck mode; and
- a first leakage control circuit to boost, using VBST1 as a voltage source, VBST2 each cycle of buck mode in which an output of the second comparator is enabled.

4. The apparatus of claim 3, wherein the first leakage control circuit comprises:
- a current mirror coupled to VBST1 and having an output coupled to an input pin of the second leakage control circuit that is coupled to VBST2; and
- a field-effect transistor (FET) coupled between the current mirror and a variable-controlled current source, wherein a gate of the FET is to receive a signal from control logic indicative of the second comparator being enabled during buck mode.

5. The apparatus of claim 1, wherein the comparator comprises:
- a bootstrap voltage-to-current converter to convert VBST1 to a first current;
- a supply voltage-to-current converter to convert a supply voltage to a second current;
- a reference voltage-to-current converter to convert a reference voltage, which has the threshold value, to a third current;
- a current multiplier to generate an adjusted third current by multiplying the current multiplier by the third current;
- a current mirror to generate a fourth current comprising the second current less the adjusted third current; and
- a current mode comparator, which includes an output switch of the current mirror and that receives the first current, to enable the output of the comparator in response to the first current dropping below the fourth current.

6. The apparatus of claim 5, wherein the bootstrap voltage-to-current converter comprises a first resistor having a first resistance coupled in series with a p-type extended drain field-effect transistor (DEPFET) and a gate of the DEPFET is coupled with the first output voltage, the apparatus further comprising:
- an n-type extended drain field-effect transistor (DENFET) having:
  - a first gate coupled to the supply voltage;
  - a first drain coupled to an output of the DEPFET; and
  - a source coupled to an output of the current mirror; and
- wherein the current mode comparator further comprises an n-type field effect transistor (NFET) having:
  - a second gate coupled to the source of the DENFET and to a drain of the output switch;
  - a second drain coupled to the supply voltage; and
  - a second source coupled to ground.

7. The apparatus of claim 5, wherein the current multiplier comprises a second current mirror having a pair of gate-coupled transistors, the apparatus further comprising control logic adapted to program the current multiplier by setting a threshold voltage of an output transistor of the gate-coupled transistors.

8. The apparatus of claim 5, wherein the supply voltage-to-current converter comprises a second current mirror coupled in series to a resistor and the reference voltage-to-current converter comprises:
- a first p-type field-effect transistors (PFET) coupled between the supply voltage and a first NFET of the current multiplier;
- a second PFET coupled between the supply voltage and a resistor; and
- a second comparator having a negative terminal coupled to the reference voltage, a positive terminal coupled to an output of the second PFET, and a comparator output coupled to gates of the first PFET and the second PFET.

9. A system comprising:
- a gate driver buck converter comprising:
  - a first high-side driver of a buck-boost converter, the first high-side driver powered between a first bootstrap voltage (VBST1) and a first output voltage of a first high-side switch driven by the first high-side driver;
  - a first comparator to detect VBST1 drop below a threshold value with respect to the first output voltage when the buck-boost converter is in boost mode; and
  - a first leakage control circuit to boost, using VBST1 as a voltage source, a second bootstrap voltage (VBST2) each cycle of buck mode in which an output of a second comparator is enabled; and
- a gate driver boost converter comprising:
  - a second high-side driver of the buck-boost converter, the second high-side driver powered between a second bootstrap voltage (VBST2) and a second output voltage of a second high-side switch driven by the second high-side driver;
  - the second comparator to detect VBST2 drop below the threshold value with respect to the second output voltage when the buck-boost converter is in buck mode; and
  - a second leakage control circuit to boost, using VBST2 as a voltage source, VBST1 each cycle of boost mode in which an output of the first comparator is enabled.

10. The system of claim 9, further comprising:
- a first Schottky diode coupled to a driver supply voltage; and
- a first capacitor to provide VBST1, wherein a first terminal of the first capacitor is coupled to the first Schottky diode and a VBST1 terminal of the gate driver buck converter, and a second terminal of the first capacitor is coupled to a switch pin of the gate driver buck converter, the switch pin being coupled to the first output voltage.

11. The system of claim 9, further comprising:
- a second Schottky diode coupled to a driver supply voltage; and
- a second capacitor to provide VBST2, wherein a first terminal of the second capacitor is coupled to the second Schottky diode and a VBST2 terminal of the gate driver boost converter, and a second terminal of the second capacitor is coupled to a switch pin of the gate driver boost converter, the switch pin being coupled to the second output voltage.

12. The system of claim 9, further comprising control logic, which comprises:
a first AND gate having
first inputs comprising a boost mode detect signal and an output of the first comparator; and
a first output coupled to the second leakage control circuit to trigger the boost of VBST1 during boost mode; and
a second AND gate having
second inputs comprising a buck mode detect signal and an output of the second comparator; and
a second output coupled to the first leakage control circuit to trigger the boost of VBST2 during buck mode.

13. The system of claim 9, wherein the first leakage control circuit comprises:
a current mirror coupled to VBST1 and having an output coupled to a second input pin of the second leakage control circuit that is coupled to VBST2; and
a field-effect transistor (FET) coupled between the current mirror and a variable-controlled current source, wherein a gate of the FET is to receive a signal from control logic indicative of the second comparator being enabled during buck mode.

14. The system of claim 9, wherein the second leakage control circuit comprises:
a current mirror coupled to VBST2 and having an output coupled to a first input pin of the first leakage control circuit that is coupled to VBST1; and
a field-effect transistor (FET) coupled between the current mirror and a variable-controlled current source, wherein a gate of the FET is to receive a signal from control logic indicative of the first comparator being enabled during boost mode.

15. The system of claim 14, wherein the second leakage control circuit further comprises an active n-type metal-oxide semiconductor (NMOS) diode comprising:
a pair of self-biased NFETs connected in series and coupled to VBST2; and
a p-type drain extended field-effect transistor (DEPFET) connected in series between the pair of self-biased NFETs and a second input pin that receives voltage from VBST1, wherein a gate of the DEPFET is to receive the second output voltage.

16. The system of claim 14, wherein the current mirror is a first current mirror, and wherein the FET is a first NFET, and wherein the second leakage control circuit further comprises:
a pair of drain-extended n-type field-effect transistors (DENFETs) connected in a high-voltage current mirror and coupled between the first current mirror and ground;
a second NFET coupled between a first DENFET of the pair of DENFETs and the ground; and
the first NFET coupled between a second DENFET of the pair of DENFETs and the ground, wherein a gate of each of the first NFET and the second NFET are to receive the signal from the control logic indicative of the first comparator being enabled during boost mode.

17. The system of claim 16, further comprising a stabilizer circuit coupled between the first current mirror and the pair of DENFETs, the stabilizer circuit comprising:
a resistor coupled to VBST2;
a first DEPFET coupled between the resistor and the first DENFET;
a chain of stabilizing FETs coupled between gates of the first current mirror, VBST2, the resistor, and the second output voltage; and
a second DEPFET coupled between an output of the first current mirror and an output pin to be coupled to the first input pin of the first leakage control circuit, wherein gates of the first DEPFET and the second DEPFET are to receive the second output voltage.

18. A Universal Serial Bus (USB) Type-C controller comprising:
a gate driver buck converter comprising:
a first high-side driver configured for a buck-boost converter, the first high-side driver powered between a first bootstrap voltage (VBST1) of a first capacitor and a first output voltage of a first high-side switch of the buck-boost converter driven by the first high-side driver;
a first comparator to detect VBST1 drop below a threshold value with respect to the first output voltage when the buck-boost converter is in boost mode; and
a first low-side driver to drive a first low-side switch of the buck-boost converter;
a gate driver boost converter comprising:
a second high-side driver configured for the buck-boost converter, the second high-side driver powered between a second bootstrap voltage (VBST2) of a first capacitor and a second output voltage of a second high-side switch of the buck-boost converter driven by the second high-side driver;
a second comparator to detect VBST2 drop below the threshold value with respect to the second output voltage when the buck-boost converter is in buck mode; and
a second low-side driver to drive a second low-side switch of the buck-boost converter; and
control logic coupled to the gate driver buck converter and the gate driver boost converter, wherein the control logic is to:
detect an output enabled of one of the first comparator or the second comparator; and
cause each of the first high-side driver, the first low-side driver, the second high-side driver, and the second low-side driver to toggle an output in response to the detection.

19. The USB Type-C controller of claim 18, wherein the control logic is further to:
detect the output of the first comparator be deasserted; and
cause the buck-boost converter to re-enter boost mode.

20. The USB Type-C controller of claim 18, wherein the control logic is further to:
detect the output of the second comparator be deasserted; and
cause the buck-boost converter to re-enter buck mode.

* * * * *